US009270150B2

(12) United States Patent
Sharples et al.

(10) Patent No.: US 9,270,150 B2
(45) Date of Patent: Feb. 23, 2016

(54) AXIAL GAP ROTATING ELECTRICAL MACHINE

(71) Applicant: Clear Path Energy, LLC, Wilmington, DE (US)

(72) Inventors: William G. Sharples, San Francisco, CA (US); Patrick J. McCleer, Jackson, MI (US)

(73) Assignee: Clear Path Energy, LLC, Wilmington, DE (US)

( * ) Notice: Subject to any disclaimer, the term of this patent is extended or adjusted under 35 U.S.C. 154(b) by 579 days.

(21) Appl. No.: 13/743,187

(22) Filed: Jan. 16, 2013

(65) Prior Publication Data

US 2013/0200630 A1 Aug. 8, 2013

Related U.S. Application Data

(63) Continuation-in-part of application No. 12/968,670, filed on Dec. 15, 2010, now Pat. No. 8,373,299.

(60) Provisional application No. 61/287,157, filed on Dec. 16, 2009, provisional application No. 61/314,146, filed on Mar. 15, 2010.

(51) Int. Cl.
*H02K 7/08* (2006.01)
*F03D 9/00* (2006.01)
*F03D 1/06* (2006.01)
*H02K 7/18* (2006.01)

(52) U.S. Cl.
CPC .............. *H02K 7/085* (2013.01); *F03D 1/0608* (2013.01); *F03D 9/002* (2013.01); *H02K 7/088* (2013.01); *H02K 7/1869* (2013.01); *F05B 2220/7066* (2013.01); *F05B 2240/93* (2013.01); *Y02E 10/721* (2013.01); *Y02E 10/725* (2013.01)

(58) Field of Classification Search
CPC ...................................................... Y02E 10/271
USPC ....................................................... 290/44, 55
See application file for complete search history.

(56) References Cited

U.S. PATENT DOCUMENTS 2,177,801 A 10/1939 Erren
3,789,252 A 1/1974 Abegg
(Continued)

FOREIGN PATENT DOCUMENTS

JP 2008099344 4/2008
WO 2009016372 2/2009

OTHER PUBLICATIONS

International Search Report and Written Opinion of the ISA for PCT/US2010/060614, filed Dec. 15, 2010.
(Continued)

*Primary Examiner* — Naishadh Desai
(74) *Attorney, Agent, or Firm* — PatentBest; Andrew McAleavey

(57) ABSTRACT

Direct drive rotating electrical machines with axial air gaps are disclosed. In these machines, a rotor ring and stator ring define an axial air gap between them. Sets of gap-maintaining rolling supports bear between the rotor ring and the stator ring at their peripheries to maintain the axial air gap. Also disclosed are wind turbines using these generators, and structures and methods for mounting direct drive rotating electrical generators to the hubs of wind turbines. In particular, the rotor ring of the generator may be carried directly by the hub of a wind turbine to rotate relative to a shaft without being mounted directly to the shaft.

20 Claims, 14 Drawing Sheets

(56) References Cited

U.S. PATENT DOCUMENTS

| | | | |
|---|---|---|---|
| 4,449,889 A | 5/1984 | Belden | |
| 5,057,726 A | 10/1991 | Mole | |
| RE34,268 E | 6/1993 | Muller | |
| 5,315,159 A * | 5/1994 | Gribnau | F03D 9/002 290/55 |
| 5,599,168 A | 2/1997 | Lund | |
| 6,064,123 A * | 5/2000 | Gislason | F03D 9/002 290/44 |
| 6,177,735 B1 | 1/2001 | Chapman | |
| 6,492,756 B1 | 12/2002 | Maslov | |
| 6,664,655 B2 | 12/2003 | Vann | |
| 6,727,600 B1 | 4/2004 | Abdurachmanov | |
| 6,759,758 B2 | 7/2004 | Torres Martinez | |
| 6,791,222 B1 | 9/2004 | Maslov | |
| 6,836,028 B2 * | 12/2004 | Northrup | F03D 9/002 290/44 |
| 7,042,109 B2 | 5/2006 | Gabrys | |
| 7,075,189 B2 | 7/2006 | Heronemus | |
| 7,119,453 B2 | 10/2006 | Bywaters et al. | |
| 7,154,191 B2 | 12/2006 | Jansen | |
| 7,156,037 B2 | 1/2007 | Borgen | |
| 7,156,586 B2 | 1/2007 | Nim | |
| 7,180,204 B2 | 2/2007 | Grant | |
| 7,183,665 B2 | 2/2007 | Bywaters | |
| 7,186,083 B2 * | 3/2007 | Bayly | F03D 7/0248 290/1 B |
| 7,202,584 B2 | 4/2007 | Ida | |
| 7,204,673 B2 | 4/2007 | Wobben | |
| 7,293,960 B2 | 11/2007 | Yamamoto | |
| 7,315,102 B2 | 1/2008 | Minagawa | |
| 7,355,309 B2 | 4/2008 | Costin | |
| 7,456,515 B2 | 11/2008 | Nielsen | |
| 7,456,534 B2 * | 11/2008 | Engstrom | H02K 7/088 310/75 C |
| 7,482,720 B2 | 1/2009 | Gordon | |
| 7,579,744 B2 | 8/2009 | Kato | |
| 7,612,462 B2 | 11/2009 | Viterna | |
| 7,646,132 B2 | 1/2010 | Halstead | |
| 7,687,932 B2 | 3/2010 | Casazza | |
| 7,709,971 B2 | 5/2010 | Sane | |
| 7,944,074 B2 | 5/2011 | Longtin et al. | |
| 2004/0041409 A1 * | 3/2004 | Gabrys | F03D 9/002 290/55 |
| 2004/0169376 A1 | 9/2004 | Ruer | |
| 2005/0155346 A1 | 7/2005 | Nikolaus | |
| 2006/0062676 A1 | 3/2006 | Jakubowski | |
| 2006/0071575 A1 | 4/2006 | Jansen et al. | |
| 2006/0158055 A1 | 7/2006 | Ivtsenkov | |
| 2006/0269362 A1 | 11/2006 | Henriksen | |
| 2007/0036657 A1 | 2/2007 | Wobben | |
| 2007/0075548 A1 | 4/2007 | Bagepalli et al. | |
| 2007/0200349 A1 | 8/2007 | Bacon | |
| 2007/0207028 A1 | 9/2007 | Nicholas et al. | |
| 2007/0214632 A1 | 9/2007 | Kojima | |
| 2008/0012346 A1 | 1/2008 | Bertolotti | |
| 2008/0161189 A1 | 7/2008 | Lewis et al. | |
| 2008/0199309 A1 | 8/2008 | Bagepalli et al. | |
| 2008/0272602 A1 | 11/2008 | Kim et al. | |
| 2009/0243301 A1 | 10/2009 | Longtin et al. | |
| 2010/0133838 A1 | 6/2010 | Borgen | |

OTHER PUBLICATIONS

The Most Amazing Windmills in the World, Internet. Available at http://www.mywindpowersystem.com/2009/05/the-most-amazing-wind-turbines-designs/. May 2009. Last visited Oct. 6, 2010.

History: MOD-2/MOD-5B Wind Turbines, Internet. Available at http://www.boeing.com/history/boeing/windturbine.html. Last visited Dec. 14, 2010.

* cited by examiner

AXIAL GAP ROTATING ELECTRICAL MACHINE

CROSS-REFERENCE TO RELATED APPLICATIONS

This patent application is a continuation-in-part of U.S. patent application Ser. No. 12/968,670, filed on Dec. 15, 2010, which claims priority to U.S. Provisional Patent Application No. 61/287,157, filed Dec. 16, 2009, and to U.S. Provisional Patent Application No. 61/314,146, filed Mar. 15, 2010. The contents of all of those applications are hereby incorporated by reference in their entireties.

STATEMENT REGARDING FEDERALLY SPONSORED RESEARCH OR DEVELOPMENT

This invention was made with government support under grant no. EE0005489 awarded by the Department of Energy. The government has certain rights in this invention.

BACKGROUND OF THE INVENTION

1. Field of the Invention

The invention relates generally to rotating electrical machines, such as motors and generators, and more particularly to direct drive generators with axial air gaps.

2. Description of Related Art

In a typical electrical generator, a rotor with an array of magnetic elements, such as permanent magnets, is driven by a mechanical force to rotate in close proximity to a stationary stator, which carries metallic windings. An air gap is maintained between the magnetic elements of the rotor and the windings of the stator. Typically, the mechanical force used to turn the rotor is supplied by a rotating input shaft, and a gearbox is coupled between the input shaft and the shaft on which the rotor is mounted in order to increase the angular velocity of the rotor shaft as compared with the input shaft.

Electrical generators are used in a variety of contexts, including wind turbines. In a wind turbine, wind provides the mechanical force to drive an electrical generator. In a typical case, the wind drives a set of blades, which cause a hub to rotate an axle. The axle acts as the input shaft for the generator. The generator is generally coupled to the axle through a gearbox.

More recently, so-called "direct drive" generators have shown promise in use with wind turbines. In a direct drive generator, there is no gearbox; the generator rotor turns or rotates at the same rate as the blades and hub. Because a direct drive generator does not use a gearbox, it is typically much larger than a traditional generator, so that it can generate adequate electricity at the slower speed of rotation. Direct drive generator diameters of greater than 3 meters are common in wind turbine applications with a power rating above 2 Megawatts (MW).

In a typical direct drive generator, such as that disclosed in U.S. Pat. No. 7,456,534 to Engstrom, the air gap between the rotor and the stator is a radial air gap—i.e., the gap between the rotor and the stator lies along the radial edge of the rotor, and the stator faces the radial edge of the rotor on the other side of the air gap. In such direct drive generators, one of the main problems is maintaining a uniform air gap. The dimensions of the typical direct drive generator make that difficult—the diameter of the rotor may be 2 meters or more, but the air gap is usually on the order of 5 to 10 millimeters.

SUMMARY OF THE INVENTION

Aspects of the invention relate to generators, and in particular, direct drive generators. In one embodiment of a generator according to this aspect of the invention, a rotor ring has a peripheral channel with left and right sidewall portions and a central web portion. Opposite faces of the central web portion carry first and second sets of magnetic elements. A stator ring has a peripheral portion that is sized and adapted to be at least partially received in the peripheral channel of the rotor ring between the left and right sidewalls. The peripheral portion of the stator ring has left and right inner faces carrying respective first and second sets of stator teeth, respectively. Each of the stator teeth has windings or coils. The rotor ring is constructed and arranged to rotate relative to the stator ring. The positioning of the stator ring relative to the rotor ring establishes first and second axial air gaps between the magnetic elements and the stator teeth. One or more sets of rolling gap supports bears between the stator ring and the rotor ring so as to maintain the first and second axial air gaps. In some embodiments, the sets of rolling gap supports may be essentially horizontal or axial (i.e., extending in the direction of the air gaps). In other embodiments, the sets of rolling gap supports may be inclined at an angle of up to about 45°.

Another aspect of the invention relates to wind turbines with direct drive generators. The wind turbine includes at least two blades connected to a hub for rotation about an axle, a generator, and a connector. The generator may have the features described above, and typically includes two axial air gaps between rotor and stator and sets of rolling gap supports that maintain the air gaps. The sets of rolling gap supports may be horizontal or inclined at an angle of up to about 45°. A connector couples the wind turbine and the generator, such that the generator is driven by the wind turbine. Depending on the embodiment, the connector may also constrain the generator's motion.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the views, and in which.

DETAILED DESCRIPTION

Figure 1:
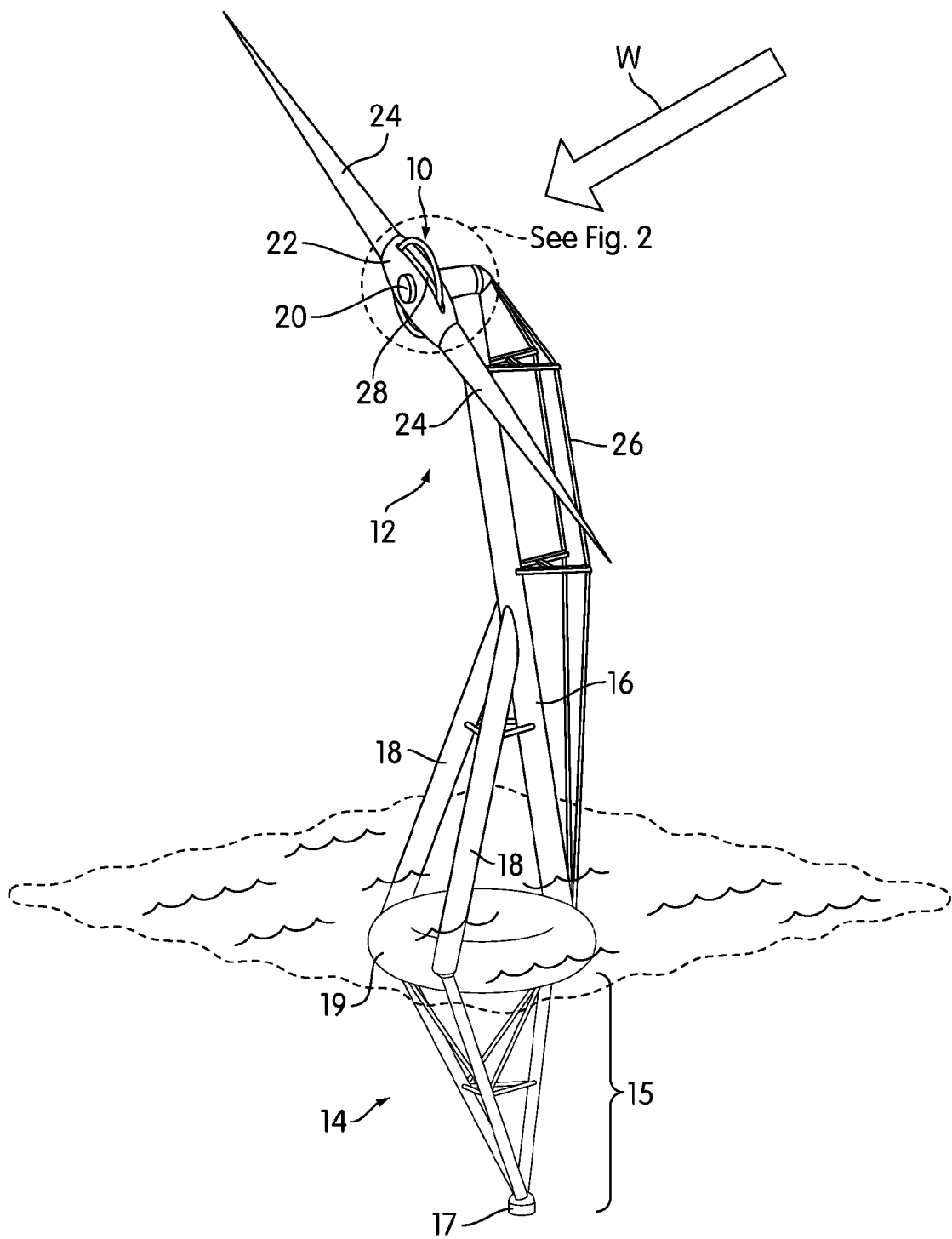
FIG. 1 is a perspective view of a wind turbine employing an axial gap direct drive generator according to one embodiment of the invention.

FIG. 1 is a perspective view of a direct drive generator, generally indicated at 10, according to one embodiment of the invention, shown as installed in a wind turbine 12. Although the direct drive generator 10 is illustrated as being installed in a wind turbine 12, as those of skill in the art will realize, direct drive generators 10 according to embodiments of the invention may be used in other contexts and as parts of other types of systems. However, wind turbines 12 may be configured and adapted to function synergistically with direct drive generators 10 according to embodiments of the invention. For that reason, a description of certain features of the wind turbine 12 is provided.

The wind turbine 12 of FIG. 1 is installed on a floating underwater support structure 14, although the wind turbine 12 may be installed on any type of land- or sea-based structure. The particular details of the illustrated floating underwater support structure 14 are disclosed in commonly-assigned U.S. Pat. No. 8,197,208, the contents of which are incorporated by reference herein in their entirety.

Briefly, the floating underwater support structure 14 of FIG. 1 comprises a truss structure 15 in the shape of an inverted pyramid or frustum that can sustain tensile and compressive loads and bending moments. The bottom of the truss structure 15 is connected to a joint 17 that allows pitch, roll, and yaw rotation. At the top of the truss structure 15, typically a few meters below the level of the water, a buoyant member 19 provides a buoyant force that is at least equal to the weight of the floating underwater support structure 14 and any structure, such as the wind turbine 12, that is mounted on it. As is described in the above-mentioned patent application, the floating underwater support structure 14 is particularly suited for structures that need to remain upright or substantially upright in water, but that can tolerate some degree of acceleration and changes in angular position. For reasons that will be explained below in more detail, although the generator 10 may be used in essentially any application, there are certain advantages to using it with the underwater support structure 14.

The wind turbine 12 has a primary support member or tower 16 and two secondary support members 18 that join the primary support member 16 at approximately its halfway point. At its top, the primary support member 16 supports an axle 20, on which a hub 22 is mounted for rotation. Two blades 24 extend from the hub 22, although a wind turbine 12 may have any number of blades. The blades 24 may be mounted to the hub 22 using pitch bearings, which would allow the wind turbine 12 to change the angle of attack of its blades 24. Other conventional techniques for controlling the angle of attack, shape, and other characteristics of the blades 24 may be used in order to control the manner in which the wind turbine 12 governs the amount of power generated. For example, the wind turbine 12 may use stall control, in which the blades 24 are shaped such that at extremely high speeds, the shape of the blades 24 causes them to stall and moderate the power generated. Alternatively, the blades 24 may include control surfaces that extend, retract, and actively change the shape of the blades 24 in order to control their speed and power output.

In operation, wind loads on the blades 24 will create an axial thrust force on the axle 20, which is transmitted through the axle 20 to induce a bending moment on the primary support member 16. Therefore, a set of tension cable supports 26 provide additional support to the primary support member 16 by counteracting those bending moments.

Figure 2:
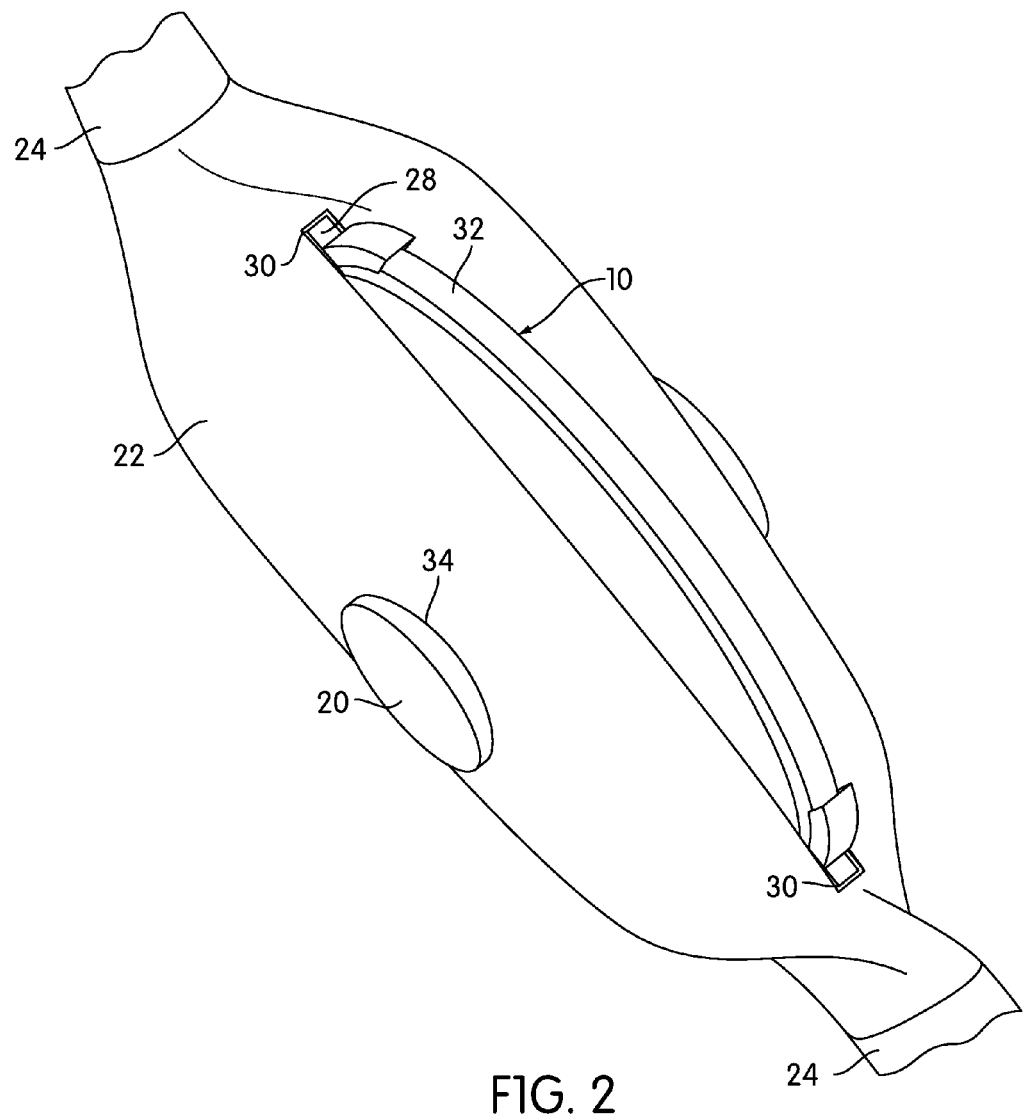
FIG. 2 is an enlarged perspective view of the axial gap direct drive generator of FIG. 1 as installed in the hub of the wind turbine.

As can be seen in FIG. 1, the direct drive generator 10 is directly integrated into the hub 22. FIG. 2 is an enlarged perspective view of the direct drive generator 10 and the hub 22 in isolation. In the illustrated embodiment, the direct drive generator 10 is carried within an elongate slot or opening 28 in the hub 22, although it may be attached to the hub 22 in other ways.

The hub 22 itself may be made of a metal, such as steel or aluminum; a composite material, such as a glass fiber or carbon fiber composite; or any other suitable material. In some embodiments, parts of the hub 22 may be made of different materials, for example, with one part of the hub made of a metal while another is made of a composite. Moreover, as shown in FIG. 2, the hub 22 is fully symmetrical front-to-back. However, in other embodiments, the hub 22 may not be symmetrical. Instead, the front of the hub 22 may be thinner than the rear, or the rear may be thinner than the front, depending on the anticipated loads and other conventional factors. In other embodiments, it may be advantageous to construct the hub 22 and blades 24 as a single piece, as a single-piece hub and blades combination may be lighter than a comparable hub 22 and blades 24 made in multiple pieces. In this case some form of control other than pitch control would need to be utilized to control the power.

The direct drive generator 10 may be mounted to the hub 22 in a number of ways. As was noted briefly above, in the embodiment illustrated in FIG. 2, the hub 22 has a large, central longitudinal opening 28. Channels 30 are secured at the top and bottom of the longitudinal central opening 28. The rotor 32 of the direct drive generator 10 is mounted to the hub 22 via the channels 30. The hub 22 also has a round axial opening 34 through which the axle 20 passes, thereby mounting the hub 22 on the axle 20. Conventional bearings, not shown in FIG. 2, would generally be used between the hub 22 and the axle 20 to facilitate rotation.

Figure 3:
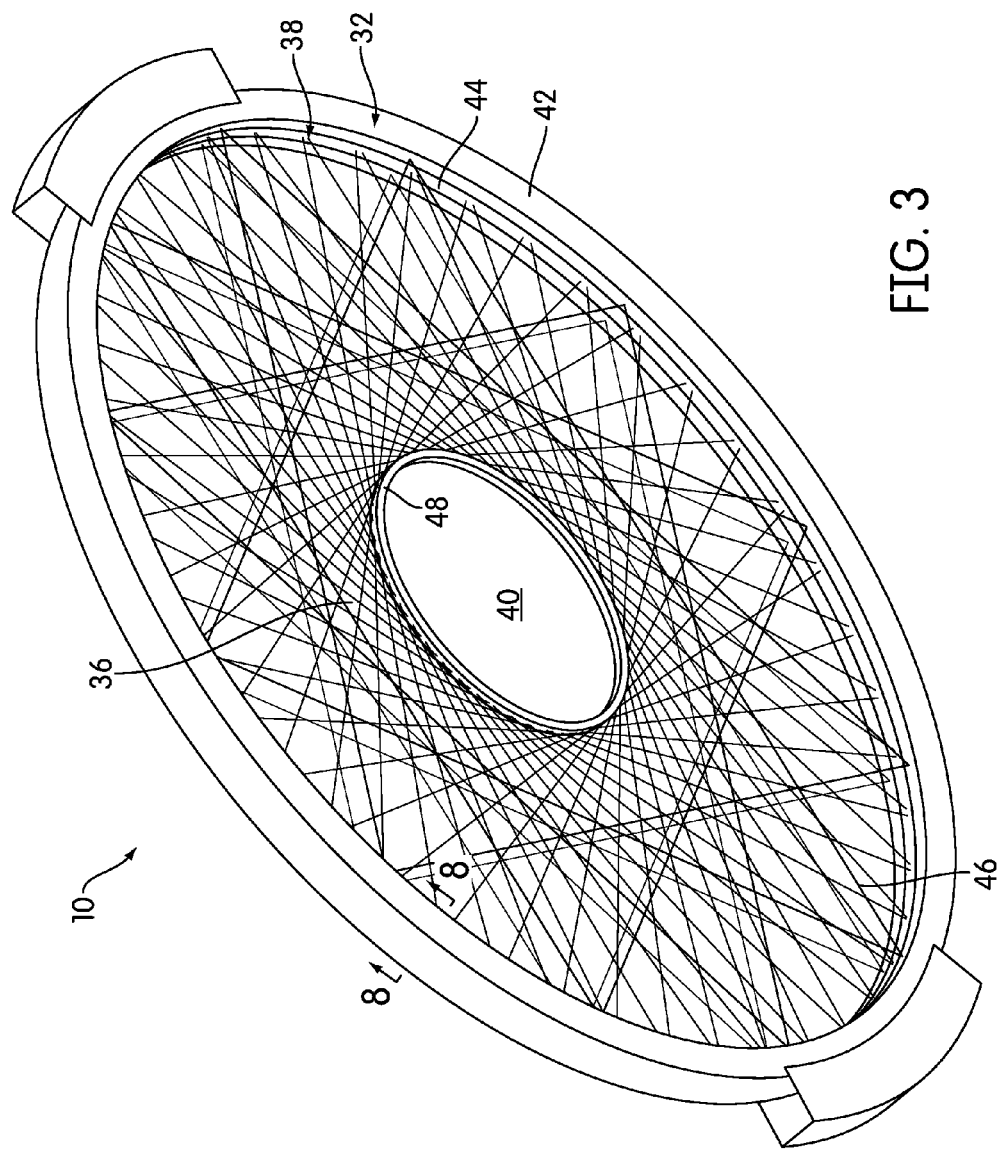
FIG. 3 is a perspective view of the axial gap direct drive generator of FIG. 1 in isolation, illustrating its open, spoked configuration.

FIG. 3 is a perspective view of the generator 10 in isolation. The rotor 32 is generally circular in overall shape and includes its own central opening 36 to allow it to fit over the axle 20. In the illustrated embodiment, the rotor 32 is carried entirely by the hub 22, and thus, it need not bear on or against or be directly connected to the axle 20. For that reason, the central opening 36 of the rotor 32 need not be round and need not be particularly shaped to fit over the axle 20. However, in other embodiments, the rotor may be mounted to the axle 20, or to any conventional shaft, by a conventional bearing. In those cases, the central opening 36 of the rotor 32 would be sized and shaped for the shaft on which it is mounted.

The stator 38 of the direct drive generator 10 also has a central opening 40 through which the axle 20 passes, mounting the stator 38 fixedly on the axle 20. Both the rotor 32 and the stator 38 have an open, spoked configuration in which the circular perimeter 42 of the rotor 32 and the corresponding circular perimeter 44 of the stator 38, when assembled, are solid, contiguous metal channels or shapes, as will be described below, and a number of spokes 46 extend through the middle of the rotor 32 and stator 38 to support the perimeters or peripheral portions 42, 44. (The rotor 32 and stator 38 may be made in segments that are assembled prior to installation.) Thus, the peripheral portion 42 of the rotor 32 and the peripheral portion 44 of the stator 38 are configured as a rotor ring and a stator ring, respectively.

In the case of the rotor 32, the spokes 46 are arranged in the general shape of a six-pointed star; they extend from one part of the rotor's periphery or perimeter 42 to another without crossing through its center, leaving an opening 36 of sufficient dimension for the axle 20 to pass through. In the case of the stator 38, the spokes 46 connect the perimeter 44 with a central ring 48 that mounts the stator 38 on the axle 20. Of course, in some embodiments, the rotor 32 may also have a central ring to which the spokes 46 connect, and its spokes may be arranged in the same way as those of the stator 38.

It should be understood that as used herein, the term "radial" refers to a direction along the radius or diameter of the rotor 32 or stator 38. The term "axial" refers to a direction orthogonal to the radial direction along the axis of rotation.

Figure 4:
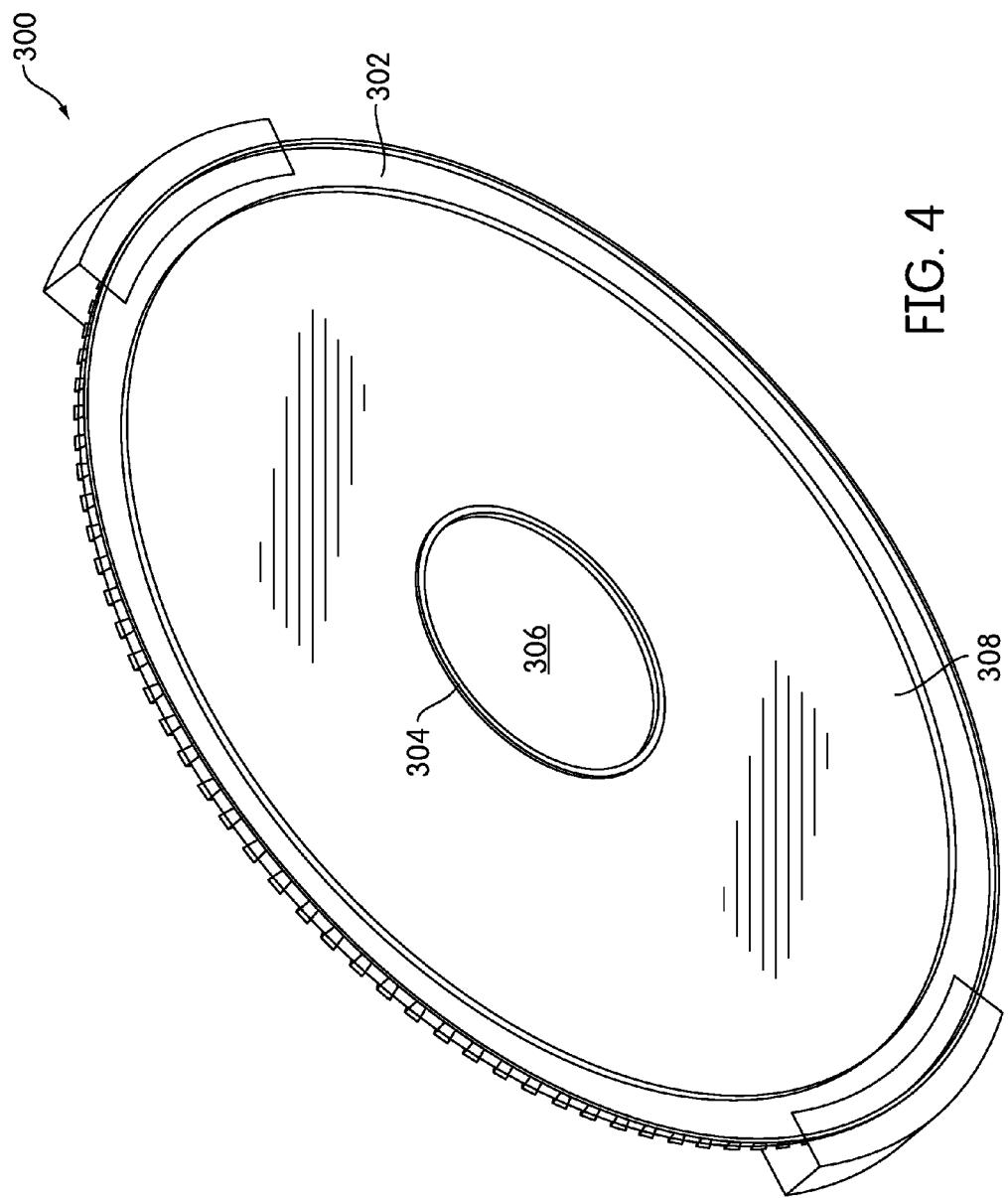
FIG. 4 is a perspective view of another embodiment of a rotor of an axial gap direct drive generator, illustrating a solid disk configuration.

Of course, the rotor 32 and stator 38 need not have spokes and could instead comprise solid disks. FIG. 4 is a perspective view of another embodiment of a rotor 300 of a direct drive generator. In the rotor 300, the perimeter 302 is connected to a central ring 304 that defines an opening 306 by a solid portion 308. In some embodiments, the solid portion 308 may have openings or open areas.

Because the rotor 32 is directly engaged with the hub 22, the mechanical energy of the blades 24 can be transferred directly to the generator 10. This is in contrast to other possible embodiments where, for example, the blades 24 and hub 22 drive a shaft, and the generator may be installed elsewhere on that shaft.

Figure 5:
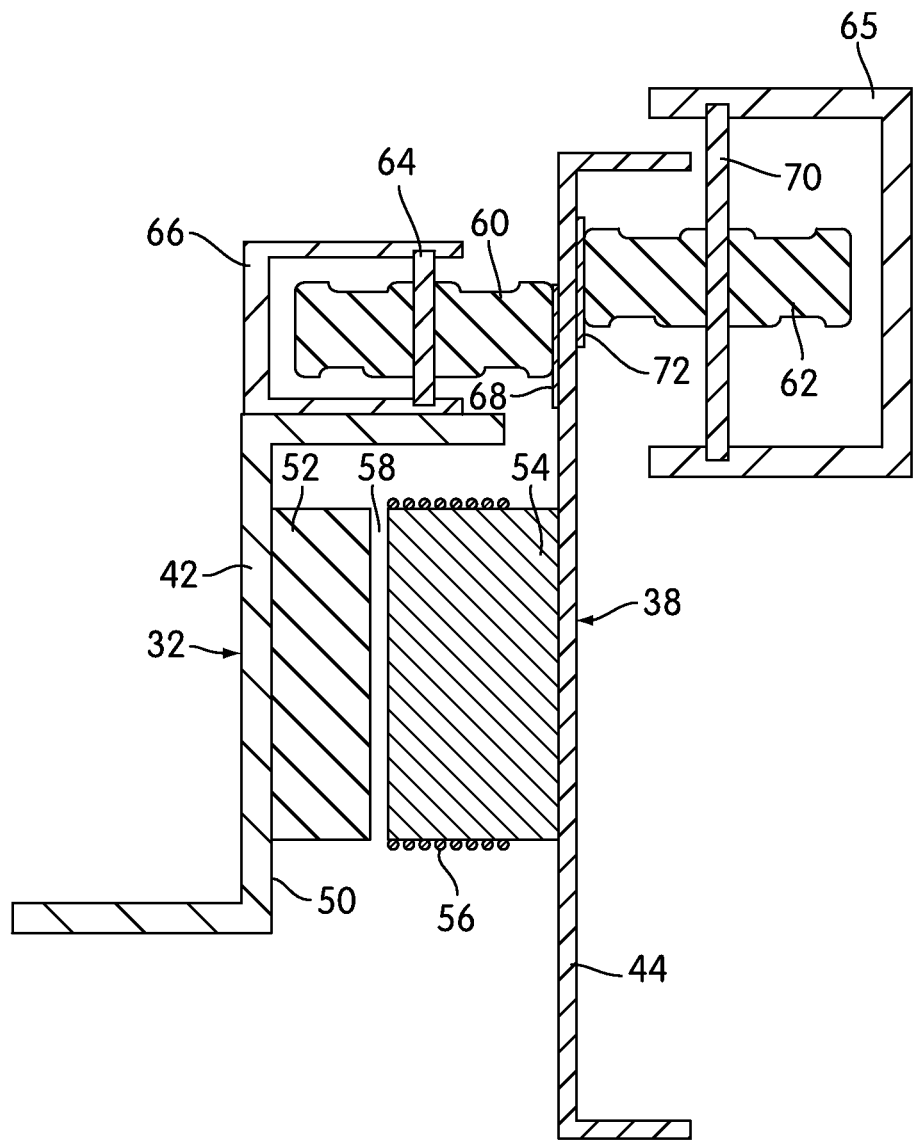
FIG. 5 is a cross-sectional view of the perimeter of the axial gap direct drive generator of FIG. 1, illustrating its gap-maintaining rolling supports.

FIG. 5 is a sectional view of the perimeters of a rotor and a stator according to one embodiment of the invention. It should be understood that the rotor and stator depicted in FIG. 5 are slightly different than the rotor and stator depicted in FIGS. 2 and 3, insofar as the generator 10 illustrated in FIGS. 2 and 3 has a rotor with a perimeter or peripheral portion that fully extends around and encloses the perimeter or peripheral portion of the stator. Those kinds of embodiments will be described below with respect to FIGS. 7 and 8. However, for the sake of convenience in description, FIGS. 5 and 6 use the same reference numerals used in FIGS. 2 and 3 to identify the rotor 32, the stator 38, and certain of their components.

In the embodiment of FIG. 5, the perimeter or peripheral portion 42 of the rotor 32 comprises a Z-channel. On an inner face 50 of the Z-channel, mounted on a back iron (not shown), the rotor 32 includes a plurality of magnetic elements 52, each evenly spaced from one another, and each positioned facing the stator 38. The perimeter or peripheral portion 44 of the stator 38, which is positioned in close proximity to the rotor 32, comprises a C-channel in the illustrated embodiment. Typically, the rotor 32 and stator 38 would be made of a metal, such as steel. The stator 38 carries a plurality of stator teeth 54 on a back iron (not shown), evenly spaced around its perimeter, arranged facing the rotor 32. Each stator tooth 54 has windings/coils 56 either wound around each tooth or wound around several teeth in distributed fashion with each coil extending approximately a magnetic pole pitch in the circumferential direction. An air gap 58 is maintained between the magnetic elements 52 of the rotor 32 and the stator teeth 54 of the stator 38. As will be described in more detail, with the arrangement shown in FIG. 5, the air gap 58 extends in the axial direction, and for this reason, is referred to in this description as an "axial air gap."

The magnetic elements 52 and stator teeth 54 may be arranged in any conventional pattern relative to one another, and they may be wired electrically in any conventional fashion. For example, they may be in an A-B-C pattern with three stator teeth 54 for each pole-pair of magnets. The rotor 32 and stator 38 may or may not be electrically divided into two or more segments. For example, in one embodiment, the direct drive generator 10 may be divided into four segments, with 122 magnetic poles per segment and a total of 488 magnetic poles. In other embodiments, 480, 640, or some other number of poles may be used, depending on the diameter of the generator 10 and other factors. An advantage of multi-segment generators is that if one segment is malfunctioning, the generator may still generate electricity using the unaffected segments. The generator 10 as a whole may generate 5-10 MW and run at 690 V, although higher voltages of 1.38 kV, 2.4 kV, 3.3 kV or 4.6 kV may be used. Any other known or compatible electrical configurations may also be used.

In most embodiments, the air gap 58 would be on the order of a few millimeters, such as 5-10 mm, while the overall generator 10 would have a diameter on the order of 3 to 20 m. In order to maintain the air gap 58, the generator 10 includes gap-maintaining elements, which in this case are sets of rolling supports 60, 62 that bear between the rotor 32 and the stator 38, as well as between the stator 38 and an external channel 64 that rotates with the hub 22.

In the illustrated embodiment, these sets of rolling supports 60, 62 are trains of wheels that are arranged around the perimeters 42, 44 of the rotor 32 and stator 38 along with the magnetic elements 52 and the stator teeth 54. As shown in FIG. 5, the first set of rolling supports 60 are mounted on respective axles 64 for rotation within a bracket 66 provided at the top of the rotor 32, above (i.e., radially outward of) the air gap 58. As mounted, the first set of rolling supports 60 bears against a race or track 68 provided along the inward face of the stator 38.

The second set of rolling supports 62 is also mounted for rotation on an axle 70 within a bracket 65 that is mounted to the hub 22 and extended only for the width of the hub 22, bear against a race or track 72 that lies on the opposite face of the stator 38. Thus, in the embodiment of FIG. 5, both sets of rolling supports 60, 62 are positioned above (i.e., radially outward of) the air gap 58.

In particularly advantageous embodiments of the invention, the sets of rolling supports 60, 62 and the tracks 68, 72 against which they bear, and any other structures prone to wear, may be made of a non-magnetic material, such as stainless steel. If those structures are made of stainless steel or other non-magnetic materials, any shavings or particles that may be created by wear will not be attracted to and attach to the magnets. The individual support wheels 60, 62 may be on the order of 100-200 mm in diameter.

Although not shown in FIG. 5, the rotor 32 and stator 38 may also include seals to seal and isolate the magnetic components from the other components and to prevent them from being fouled by debris and environmental conditions. In some embodiments, the seal may be pressure-tight and conditioned air or another gas may be pumped into the sealed area.

Figure 6:
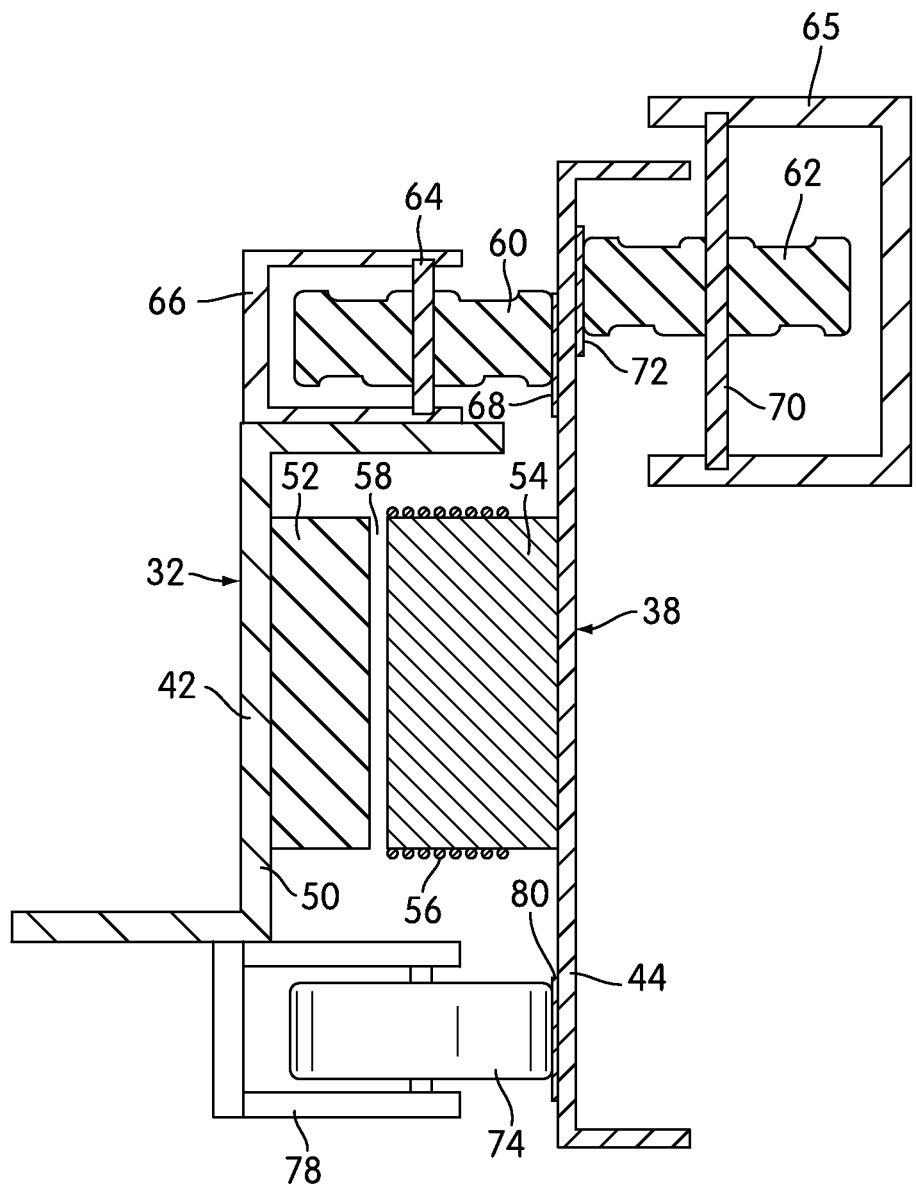
FIG. 6 is a cross-sectional view similar to the view of FIG. 5, illustrating another embodiment of an axial gap direct drive generator with two sets of gap-maintaining rolling supports.
Figure 7:
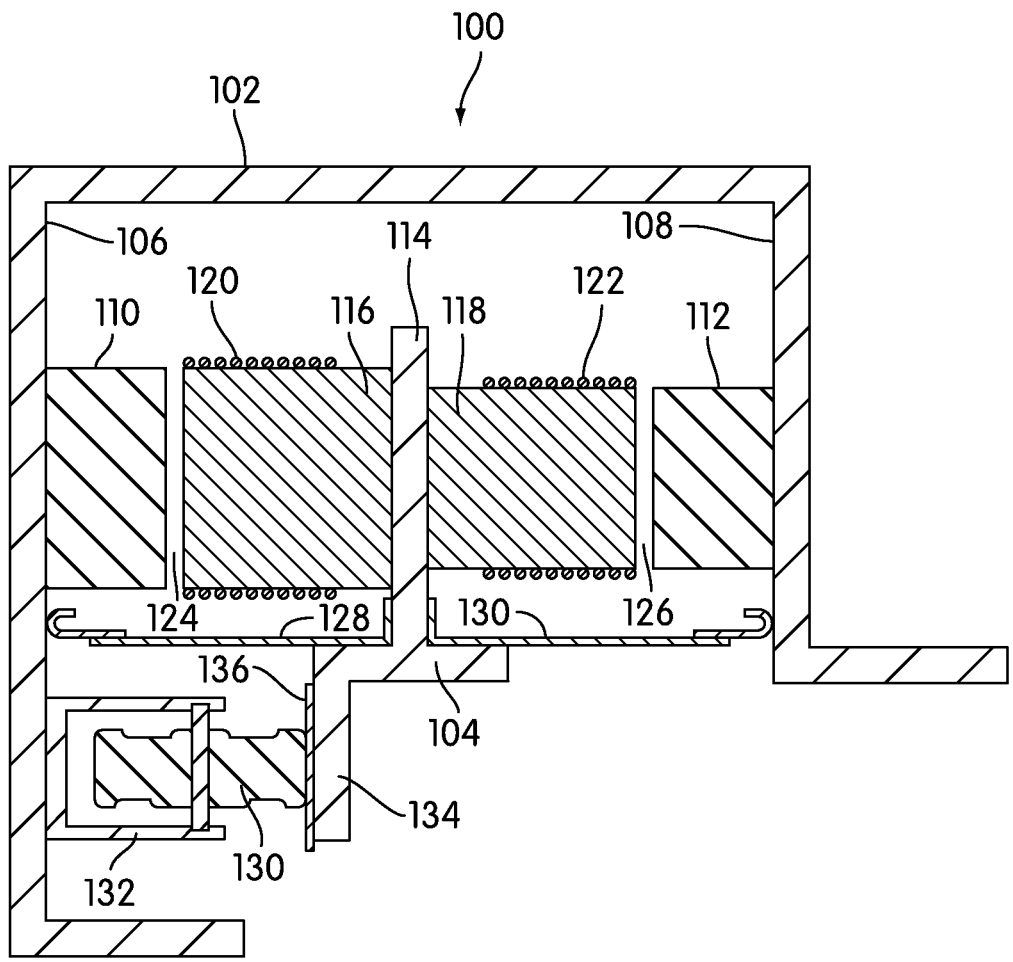
FIG. 7 is a cross-sectional view of the arrangement of yet another embodiment of an axial gap direct drive generator that includes two axial air gaps and a single set of gap-maintaining rolling supports.
Figure 8:
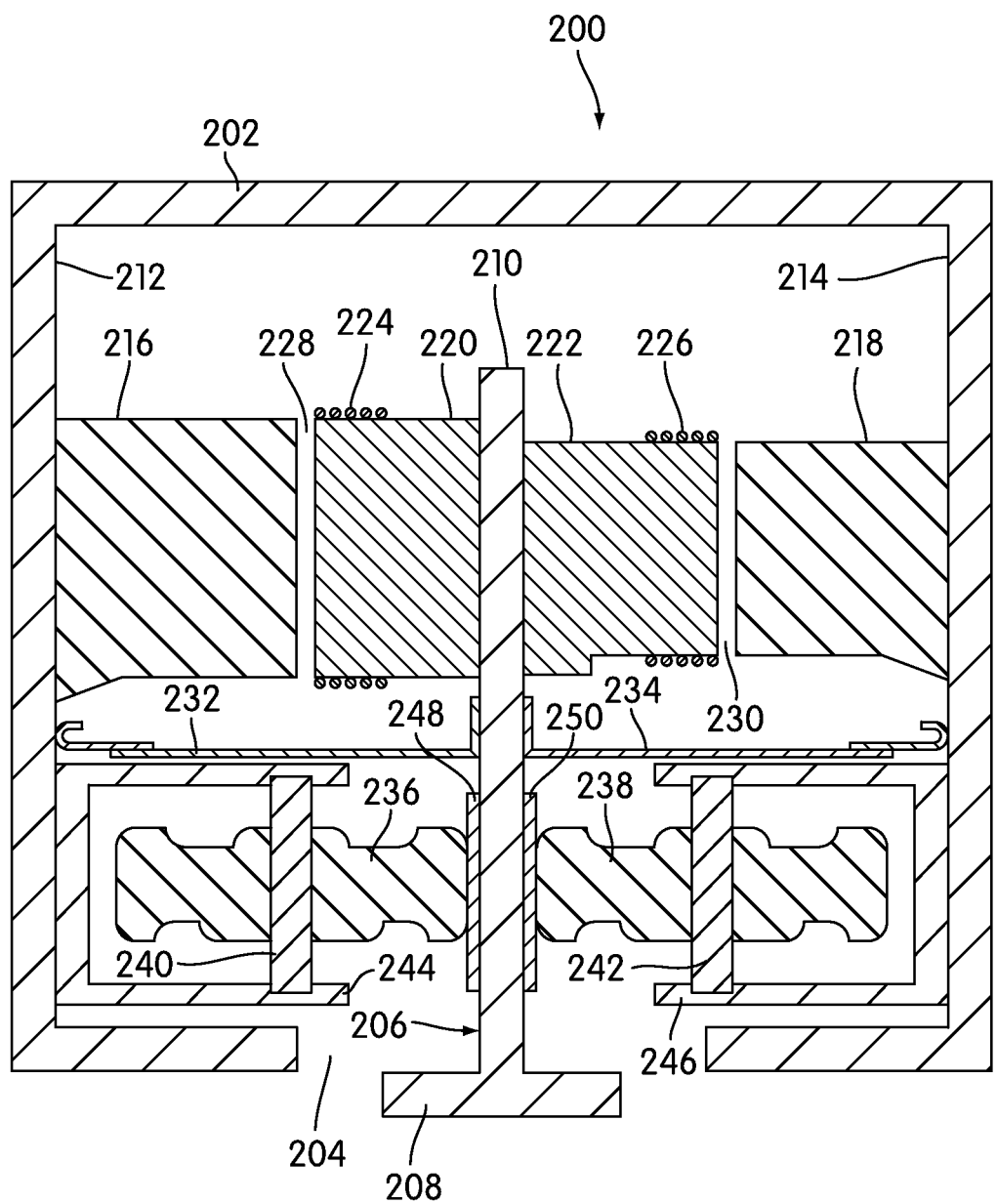
FIG. 8 is a cross-sectional view of the arrangement of yet another embodiment of an axial gap direct drive generator, taken through Line 8-8 of FIG. 3, that includes two axial air gaps and two sets of gap-maintaining rolling supports.

FIGS. 6-8 illustrate a number of embodiments that are variations on the basic concepts illustrated in FIG. 5. FIG. 6 is a cross-sectional view similar to the view of FIG. 5, illustrating another embodiment of the invention. As was described above, in FIG. 5, the sets of rolling supports 60, 62 are positioned above (i.e., radially outward of) the air gap 58. In the embodiment of FIG. 6, a set of rolling supports 74 is mounted within a bracket 78 attached to a lower portion of the Z-channel that defines the perimeter 42 of the rotor 32, such that the set of rolling supports 74 is below (i.e., radially inward of) the air gap 58. As shown, the lower set of rolling supports 74 bears against a track 80 provided on the inward face of the stator 38.

The lower set of rolling supports 74 may be offset in angular position from the other rolling supports 60, 62. In the view of FIG. 6, one of the rolling supports 74 and its bracket 78 are seen in elevation, rather than cross-section, because they are behind the plane through which the cross-section of FIG. 6 is taken.

As those of skill in the art will appreciate, the magnetic forces between the rotor 32 and stator 38 may approach several tons of attractive force per meter of the generator perimeter. Therefore, in order to balance the forces and reduce the overall mechanical stresses on the rotor 32 and stator 38, a second air gap may be provided, axially opposite the location of the first air gap.

FIG. 7 is a cross-sectional view similar to the views of FIGS. 5-6 illustrating a generator 100 that includes two air gaps. More particularly, the generator 100 includes a rotor 102 that, along its outer radial edge, forms a channel that extends around and over the top of the stator 104, thus enclosing the stator 104 on three sides. The left and right inwardly-facing sides 106, 108 of the rotor 102 carry respective sets of magnetic elements 110, 112. The stator 104 has a central, radially-extending portion 114. Each face of the radially-extending portion 114 carries a set of stator teeth 116, 118 and associated windings/coils 120, 122. Thus, the generator 100 of FIG. 5 includes two air gaps 124, 126, one air gap 124, 126 between each pair of magnetic elements 110, 112 and stator teeth 116, 118.

The two opposing sets of magnetic elements 110, 112 and stator teeth 116, 118 serve to balance the mechanical forces on the rotor 102 and stator 104. In some embodiments, the sets of magnetic elements 110, 112 and stator teeth 116, 118 may be sized so as to produce equal amounts of axially directed force. However, it is advantageous to maintain at least some degree of attractive force bias to ensure the rotating supports 130 are engaged on the track 136 between the rotor 102 and the stator 104; therefore, in the embodiment of FIG. 7, one pair of magnetic elements 112 and stator teeth 118 is radially smaller than the other 110, 116. This may be, for example, a 55%/45% split.

Below the respective air gaps 124, 126, a pair of seals 128, 130 extending between the inward walls 106, 108 of the rotor 102 and the stator 104 seals the compartment created by the rotor 102, thus isolating the electrical generating structure from other components. Below the sealed compartment, a single set of rotating supports 130 is mounted on corresponding sets of brackets to bear between the inner face 106 of the rotor 102 and a radially inwardly projecting portion 134 of the stator 104. A track 136 is provided on the face of the stator portion 134 against which the set of rotating supports 130 bear.

FIG. 8 is a cross-sectional view of another embodiment of an axial gap direct drive generator, generally indicated at 200. In the embodiment of FIG. 8, the perimeter of the rotor 202 forms a generally square or rectangular tube, extending around all four sides. An opening 204 admits the perimeter of the stator 206. In the illustrated embodiment, the perimeter of the stator 206 has the general shape of an inverted "T." An axial portion 208 serves to connect to the spokes or disk that connect the perimeter of the stator 206 to its center support. A radially-extending portion 210 connects to and extends from the axial portion 208.

The left and right inwardly-facing sides 212, 214 of the rotor 202 carry respective sets of magnetic elements 216, 218. The magnetic elements 216, 218 face the radially-extending portion 210 of the stator 206. The radially-extending portion 210 of the stator 206 carries stator teeth and backiron 220, 222 with associated windings 224, 226 that face the magnetic elements 216, 218, thereby defining two air gaps 228, 230. The magnetic elements 216 and corresponding stator teeth 220 are radially larger than the pair of magnetic elements and stator teeth 218, 222 on the other side of the stator 206, thus embodying the 55%/45% split explained above. However, in other embodiments, the pairs of magnetic elements 216, 218 and stator teeth and backiron 220, 222 may be of the same size so as to generate the same amount of magnetic force.

Below the magnetic elements 216, 218 and the stator teeth 220, 222, a pair of seals 232, 234 provides isolation for the electrical and magnetic elements of the generator. Below the seals 232, 234, arranged symmetrically to bear between the left and right inwardly-facing sides 212, 214 of the rotor 202 and the respective faces of the radially-extending portion 210 of the stator 206 are two sets of rotating elements 236, 238. Each of the rotating elements 236, 238 is mounted on an axle 240, 242 that is held by a bracket 244, 246, and each bears against a track 248, 250 on a face of the radially-extending portion 210 of the stator 206.

In embodiments in which seals 128, 130, 232, 234 are used to isolate the magnetic components, the sets of rotating elements 130, 236, 238 may not need to be made of a non-ferromagnetic material such as stainless steel. Instead, any material that can resist corrosion and/or other operating conditions may be used. It should be understood that most, if not all, embodiments would have some sort of sealing structure, although for the sake of simplicity, seals are not shown in the views of FIGS. 5 and 6.

In the above description, the gap-maintaining rolling supports are sets or trains of wheels. However, in other embodiments, rotational bearings of various sorts may be used instead of wheels. More broadly, any element that can bear between the rotor and the stator to maintain the axial air gap without undue wear may be used in embodiments of the invention.

Axial gap direct drive generators 10, 100, 200 according to embodiments of the invention may be used in wind turbines 12 and in other applications. As was noted briefly above, when used in various applications, the generators 10, 100, 200 may be mounted in various ways. The mounting of the generator 10 described above with respect to FIGS. 1 and 2 allows the hub 22 to transmit both torque and axial loads to the generator 10.

Figure 9:
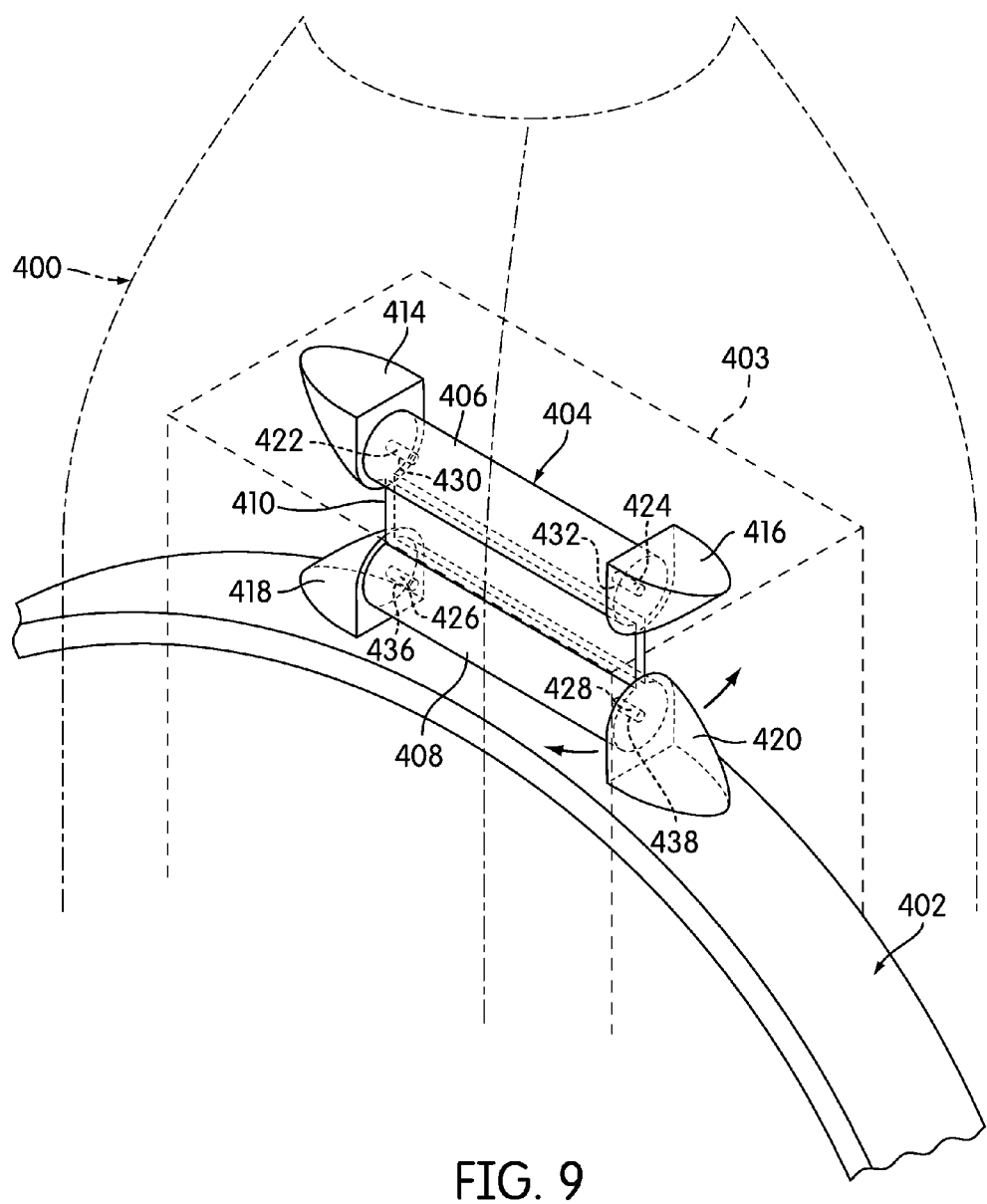
FIG. 9 is a perspective view of another embodiment of a joint between a hub and a rotor.

However, transmitting axial loads to the generator 10, 100, 200 may not be advantageous. Therefore, in some embodiments, generators 10, 100, 200 may be mounted using mechanisms that transmit torque but not axial loads. FIG. 9 is a perspective view of a portion of a hub 400 with a portion of a generator 402. The hub 400 has an elongate central slot 403 in which a hinging connector 404 is mounted. In some embodiments, the hinging connector 404 may be mounted to a channel connected to the slot 403; in other embodiments, the hinging connector 404 may be secured directly to the slot 403.

The hinging connector 404 has a rounded cylindrical upper portion 406, a rounded cylindrical lower portion 408, and a web or strip of material 410 between the upper and lower portions 406, 408. The upper and lower portions 406, 408 each have a pair of endcaps 414, 416, 418, 420 that attach to the generator 402 and the hub 400, respectively. The endcaps 414, 416, 418, 420 also mount the upper and lower portions 406, 408 for rotation, by means of axle portions 422, 424, 426, 428 that extend from the respective endcaps 414, 416, 418, 420 into corresponding openings 430, 432, 436, 438 provided within the ends of the upper and lower portions 406, 408. Thus installed, the hinging connector 404 can rotate about both of its upper and lower portions 406, 408, providing for movement in the axial direction, but can still transmit torques. Typically, a second hinging connector 404 would be installed at the bottom of the hub 400 as well.

During operation, the hub 400 of a wind turbine may deflect or move on the order of an inch (2.54 cm) or more in the axial direction as wind on the blades creates axial loads. However, the presence of the hinging connector 404 allows the hub 400 to move in the axial direction, as indicated by the arrows in FIG. 9, so that the loads are not transferred to the generator 402.

Figure 10:
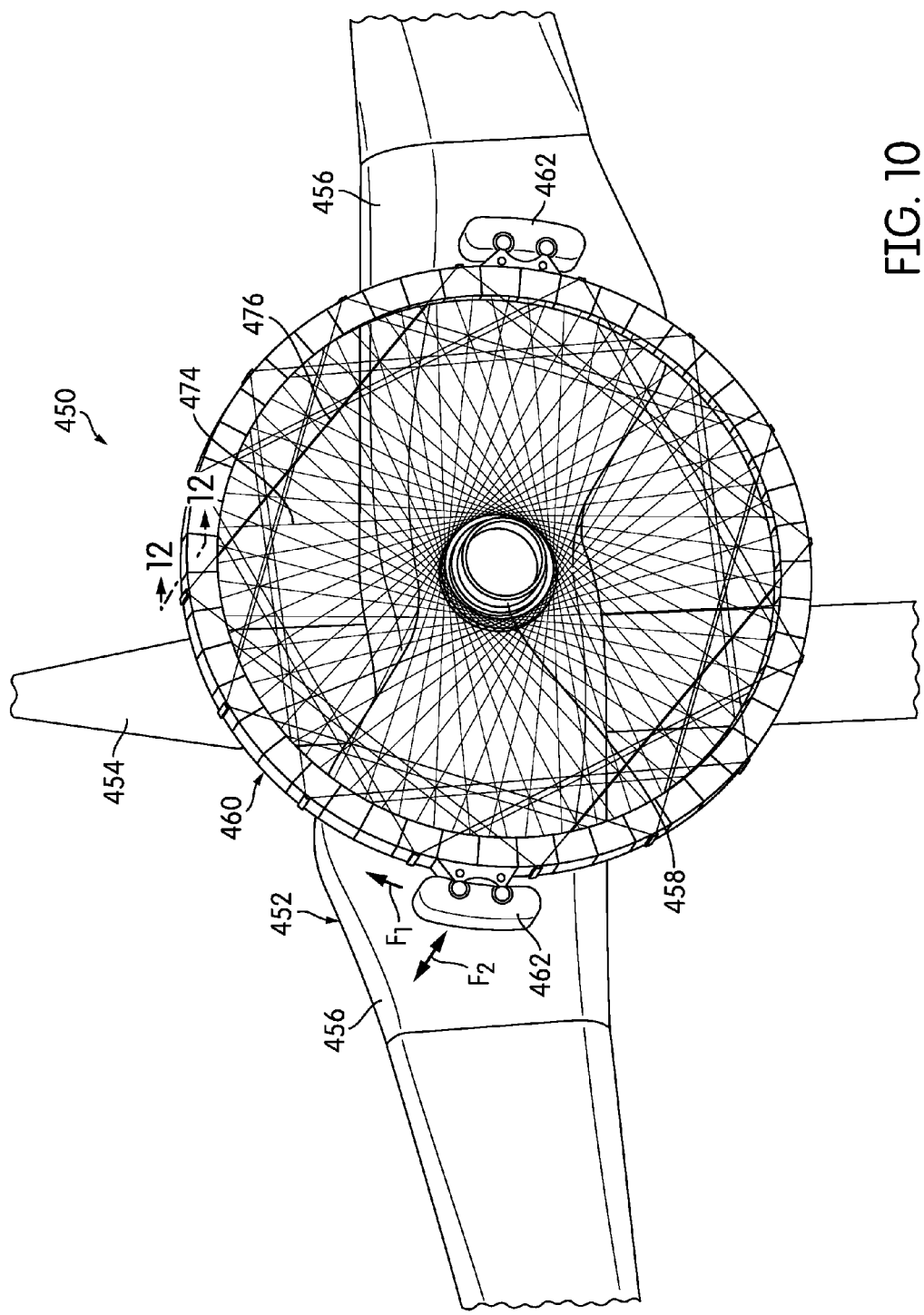
FIG. 10 is a perspective view of a generator according to another embodiment of the invention carried by and coupled to a wind turbine.

FIG. 10 is a perspective view of a wind turbine and generator assembly, generally indicated at 450. A wind turbine 452 is supported on a tower or vertical support 454. The turbine 452 itself includes a number of blades 456 that are driven by the wind to rotate about an axle 458. The generator 460 is carried on the axle 458 and is coupled to the rotating blades 456 of the wind turbine 452 by two connectors 462, which support and transmit force to the generator 460.

Figure 11:
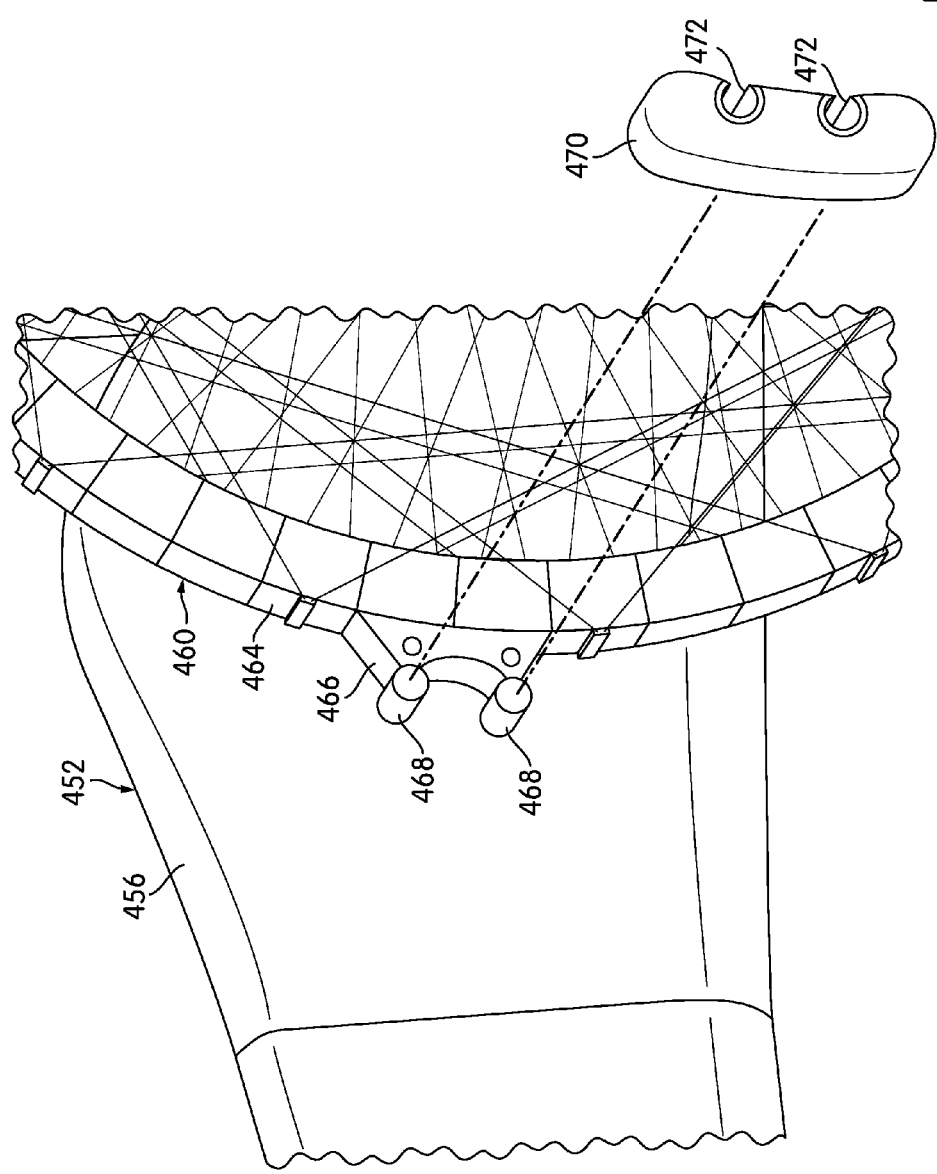
FIG. 11 is an exploded perspective view of the generator of FIG. 10, illustrating the coupling or connection between the wind turbine and the generator.

FIG. 11 is an exploded perspective view of a portion of the assembly 450 of FIG. 10, illustrating a connector 462 and the manner in which the turbine 452 and generator 460 are coupled together. As shown, the rotor 464 of the generator 460 has a radially outwardly extending projection 466 with two generally cylindrical engaging prongs 468 at its furthest extent. An engaging piece 470 attached to the blade 456 has cavities 472 and a general shape designed to mate with and engage the projections 466 on the generator 460. Thus, the generator 460 is supported by the axle 458 and coupled to the turbine 452 by the two connectors 462. Specifically, the connectors 462 transmit rotational force and induce rotational motion of the generator 460. They also support and constrain the generator 460 in the radial direction. However, the connectors 462 will not transmit axial force or motion to the generator 460. This may be helpful because the blades 456 of the turbine 452 are often buffeted by the wind while in use, causing them to flex, e.g., in the plane orthogonal to the plane of FIGS. 10 and 11, which is the axial direction with respect to the generator 460. When the blade 456 experiences an axial force (i.e., when it is buffeted by the wind and deflects out-of-plane), the two complementary pieces of the connector 466, 470 may simply slip relative to each other, rather than transmitting the force or motion of the blade 456.

The generator 460 itself is similar in many respects to the generators 10, 100, 200 described above. It is a "direct drive" or "ring" generator, with the rotor and stator arranged together in a circumferential "ring" supported by spokes. Notably, although the generator 460 has an overall "ring-like" shape, as was noted briefly above, the generator 460 may be assembled from a plurality of segments. In the illustrated embodiment, the generator 460 is assembled from 48 straight segments, meaning that the generator 460 is actually polygonal, rather than circular, although it may be fully or substantially circular in other embodiments, and portions of the following description may assume that the generator 460 is circular.

As can be appreciated from FIG. 10, and as will be explained below in more detail, spokes 474 from the stator of the generator 460 extend radially and connect with the axle 458; spokes 476 from the rotor 464 are arranged as chords in a circle—those spokes 476 extend between and support various points around the circumference of the generator 460 without transiting the center or connecting to the axle 458.

Figure 12:
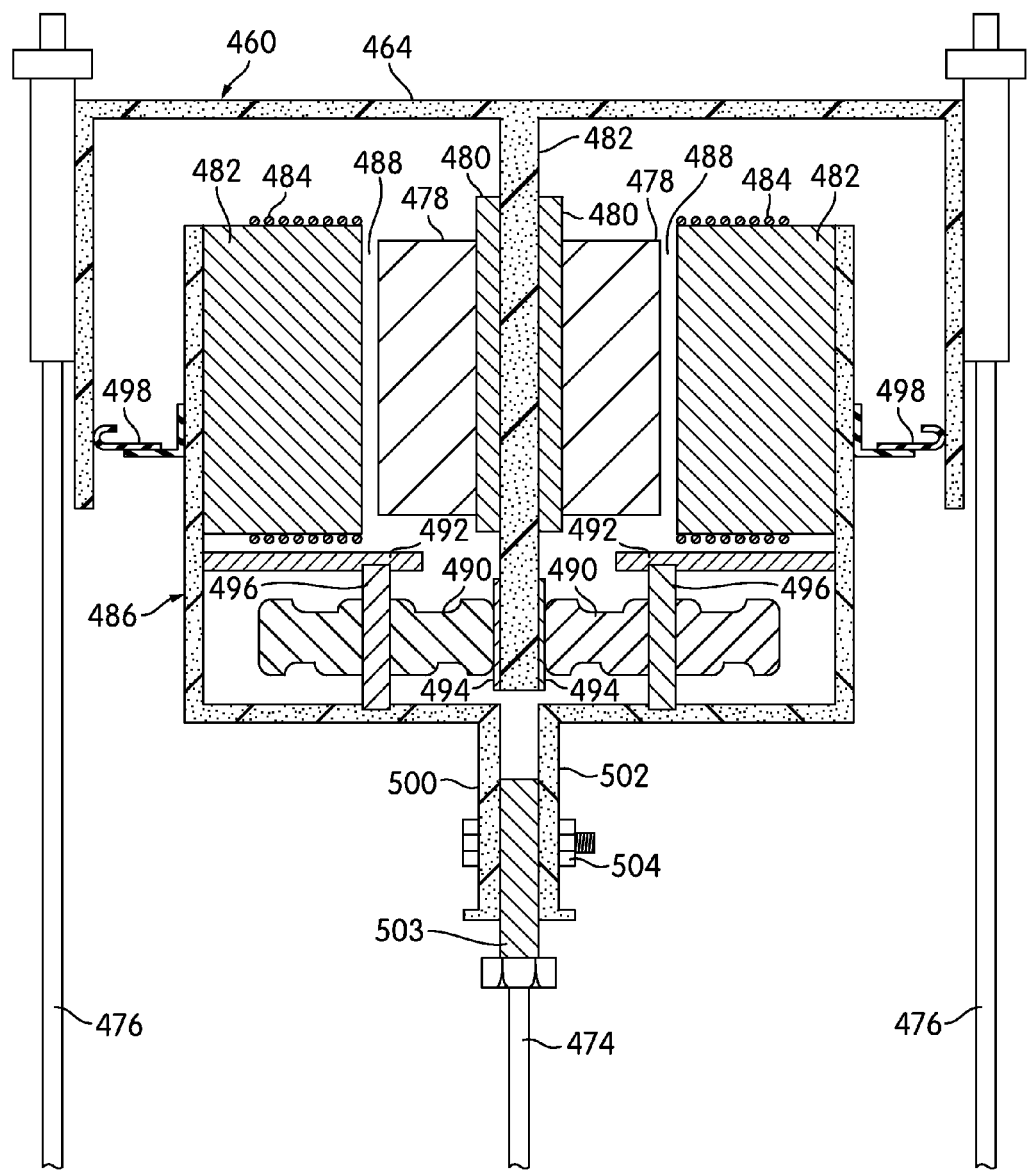
FIG. 12 is a cross-sectional view of a portion of the generator, taken through Line 12-12 of FIG. 10.

FIG. 12 is a cross-sectional view of the generator 460, taken through Line 12-12 of FIG. 10. The arrangement of the generator 460 is somewhat similar to the arrangement of the generator 200 described above; however, the "sense" of some of the components is reversed. Specifically, the rotor 464 is essentially T-shaped, and carries trains of magnetic elements 478 and their respective back irons 480 on both sides of its central web 482. Corresponding sets of stator teeth 482 with coils 484 are carried on inner faces of a generally Y-shaped stator 486, defining a pair of air gaps 488 between respective sets of magnetic elements 478 and stator teeth 482. In the illustrated embodiment, the two sets of magnetic elements 478 and stator teeth 482 are of the same or approximately the same size, although they may be of different sizes as set forth above with respect to generator 200. While the rotor 464 and the stator 486 may be made of a metal, as was described above, in the illustrated embodiment, these components 464, 486 are made of composite materials, such as glass fiber or carbon fiber composite.

In the generator 460, two sets of rolling gap supports 490 are carried by the stator 486 and bear between the rotor 464 and the stator 486. Specifically, the sets of rolling gap supports 490 are held by brackets 492 on the stator 486 to bear against wear plates 494 arranged on either side of the central web 482 of the rotor 464, near its bottom. As shown in FIG. 12, the rolling gap supports 490 rotate about essentially vertical axles 496 and extend essentially horizontally between the rotor 464 and the stator 486. With this configuration, the shape of the two connectors 462 helps to ensure that the rotor 464 and stator 486 remain in alignment with one another.

As with the generator 200, the generator 460 forms an essentially entirely sealed enclosure, with seals 498 extending between inner faces of the rotor 464 and outer faces of the stator 486.

FIG. 12 also illustrates more of the details of how the rotor 464 and stator 486 are assembled into the generator 460. Specifically, FIG. 12 illustrates the rotor spokes 476 and stator spokes 474. Additionally, as can be seen in FIG. 12, while as a whole the stator 486 is generally Y-shaped, it actually has two halves 500, 502 that meet at a ring-shaped bar 503 which in turn is connected to the spokes 474. The two halves 500, 502 are bolted to the ring-shaped bar 503 with one or more bolts 504. Thus, the entire stator 486 can be disassembled from the rotor 464.

Figure 13:
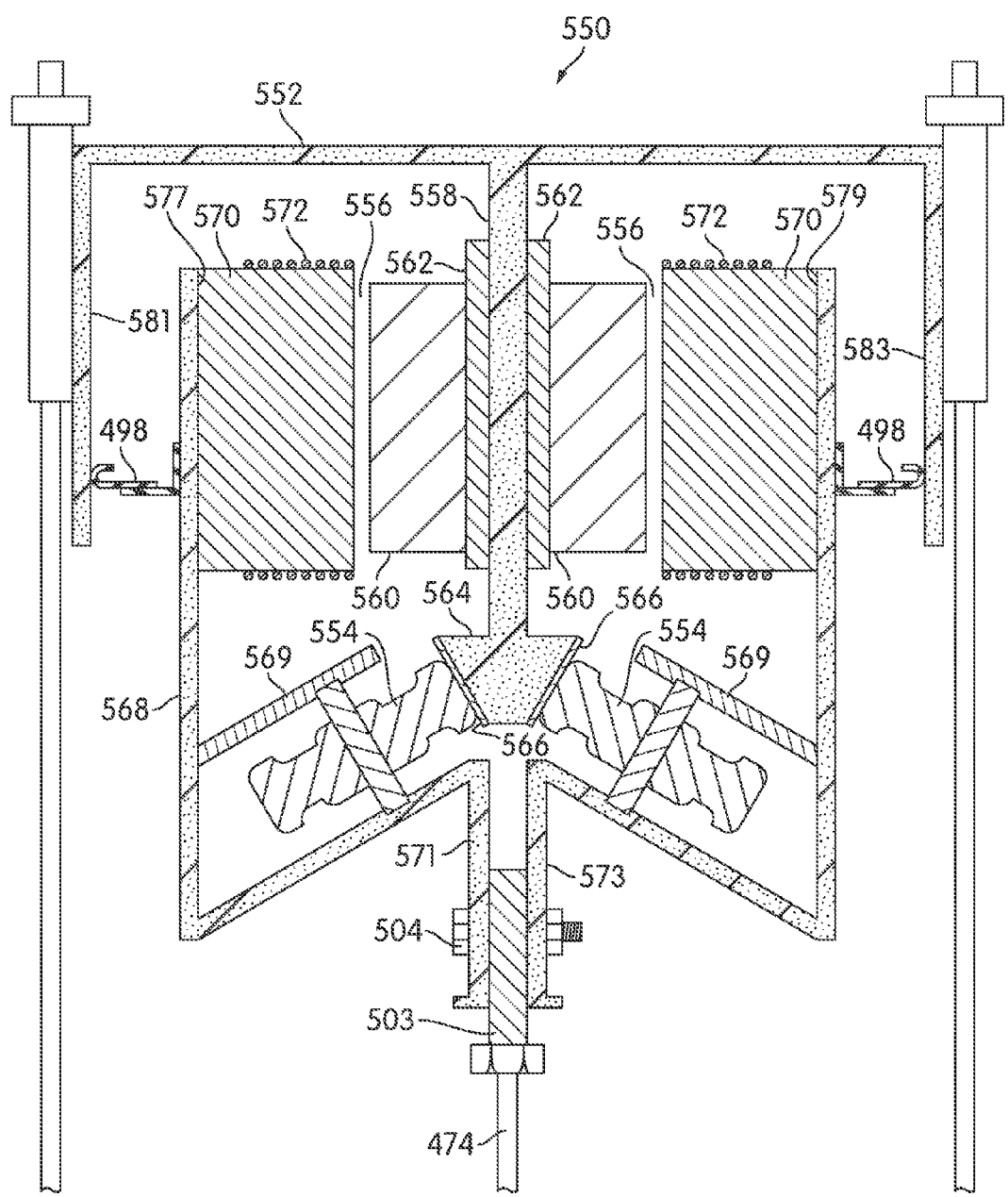
FIG. 13 is a cross-sectional view of a generator that employs two sets of angled gap-maintaining rolling supports according to yet another embodiment of the invention.

FIG. 13 is a cross-sectional view of generator, generally indicated at 550, according to another embodiment of the invention. The generator 550 is very similar to the generator 460 of FIG. 12, except that in the generator 550, the sets of rolling gap supports 554 that help to maintain the two air gaps 556 are not horizontal; rather, they are angled toward the vertical, as will be described below in more detail.

Specifically, as with generator 460, the peripheral portion of the rotor ring 552 of generator 550 is generally T-shaped with a central web 558 that carries magnetic elements 560 and their back irons 562. The central web 558 of the peripheral portion of the rotor ring 552 terminates at its lowest point with a generally trapezoidal bearing block 564. A set of wear plates 566 are provided on the angled faces of the bearing block 564, such that the angled rolling gap supports 554 bear against the wear plates 566.

The peripheral portion of the stator ring 568 is generally W-shaped and carries sets of stator teeth 570 with windings 572 on respective left and right inner faces 577, 579 in proximity to the magnetic elements 560 to form the air gaps 556. Angled brackets 569 below (i.e., radially inward of) the air gaps 556 hold the sets of rolling gap supports 554 at an angle toward the vertical, as was noted briefly above. Generally speaking, the rolling gap supports 554 will be more horizontal than vertical, i.e., in most embodiments, they will be positioned at an angle between about 0° and about 45°. As with the generator 460 of FIG. 12, the peripheral portion of the stator ring 568 includes downwardly-extending portions 571, 573 that mate with a ring-shaped central bar 503. In essence, like the generator 460, the generator 550 is comprised of two halves that meet and attach at the ring-shaped bar 503. The ring-shaped bar 503 is, in turn, attached to the spokes 474. Like the generator 460, the peripheral portion of the rotor ring 552 and the peripheral portion of the stator ring 568 of the generator 550 form a sealed enclosure. Seals 498 between respective left and right sidewall portions 581, 583 of the peripheral portion of the rotor ring 552 and the peripheral portion of the stator ring 568 seal the enclosure against weather and other forms of contamination.

Figure 14:
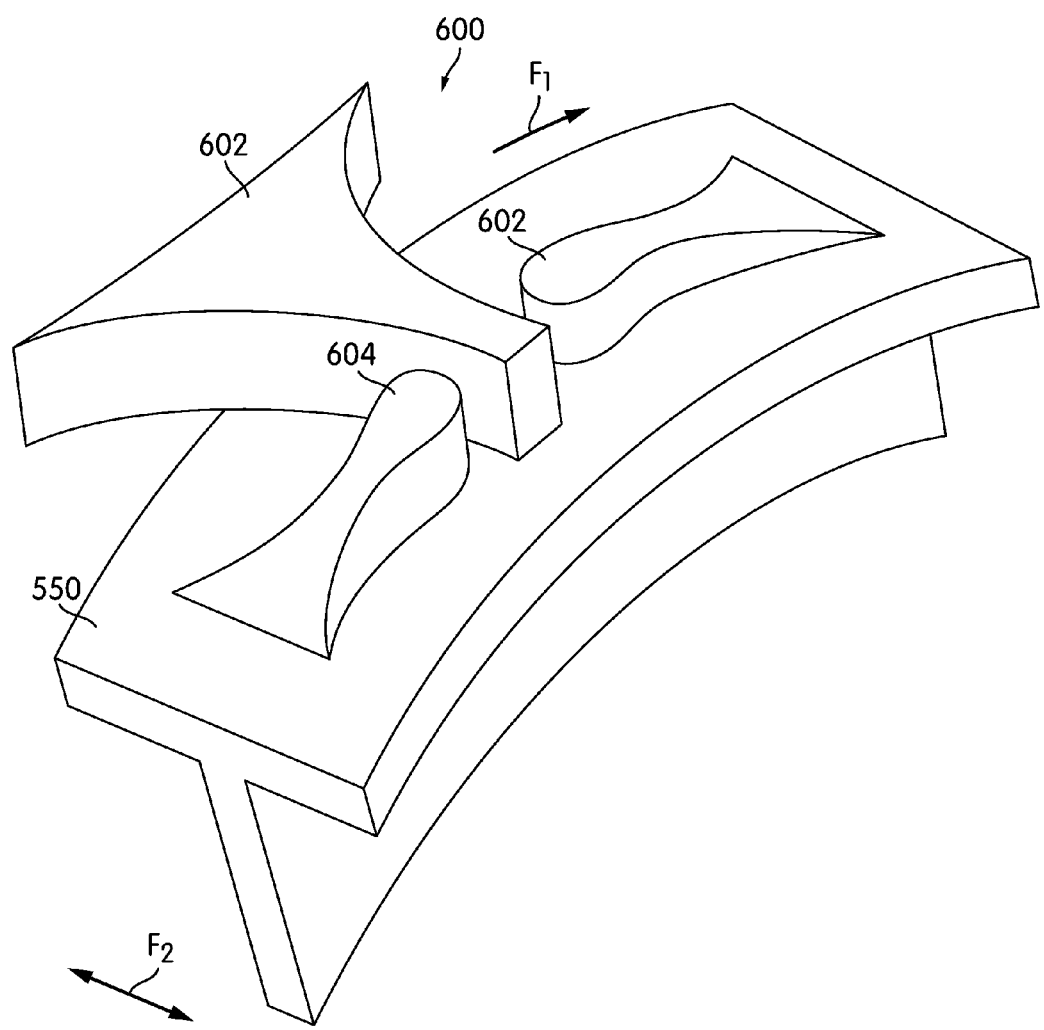
FIG. 14 is a perspective view of a generator-wind turbine connector for the generator of FIG. 13.

FIG. 14 is a perspective view of another embodiment of a connector 600 that is particularly suited for use with generator 550 of FIG. 13, illustrating how generator 550 may be connected to a wind turbine so as to be driven by it. In generator 550, the angle of the sets of rolling supports 554 may make the generator 550 better able to maintain the magnetic elements 560 and the sets of stator teeth 570 in alignment with each other if the generator 550 is subjected to loads and thrusts in the radial direction. For that reason, there may be less need for a connector like connector 462, which constrains motion in the radial direction and helps to maintain the components in alignment.

As shown in FIG. 14, a tapering projection 602 is attached to the wind turbine. The projection 602 is received between two raised projections 604 on the generator 550 that extend transversely to the projection 602 from the generator 550 and essentially define a slot for the projection 602. The projections 604 from the generator 550 have a generally round shape at the surfaces where they engage the projection 602 from the wind turbine. With this arrangement, the wind turbine can transmit force in the direction of arrow $F_1$, i.e., in the circumferential direction to drive the generator 550, but does not transmit force in the direction of arrow $F_2$. Thus, the connector 600 allows the wind turbine to drive the generator 550 without transmitting any forces that might be created by wind buffeting of the turbine blades. Additionally, the connector 600 does not support or "hold up" the rotor.

As was described briefly above, although generators 10, 100, 200, 460, 550 according to embodiments of the invention may be used in essentially any application, they may be particularly suited for sea-based applications or other applications in which accelerations and changes in angular position are likely. That is because the gap-maintaining rolling supports, and the arrangement of the axial air gap or gaps in general, make the generators 10, 100, 200, 460, 550 more robust, in that they are less sensitive to accelerations and changes in position. For example, although the embodiments illustrated and described above show the generators 10, 100, 200, 460, 550 being used in a vertical orientation, generators 10, 100, 200, 460, 550 according to embodiments of the invention could be used vertically, horizontally, or at any angular position between vertical and horizontal. For those reasons, generators 10, 100, 200, 460, 550 according to embodiments of the invention are particularly suitable for use with floating underwater support structures 14 that allow some degree of acceleration and changes in angular position.

Although the above description focused on a direct drive electrical generator with an axial air gap and gap-maintaining rolling supports, as those of ordinary skill in the art will understand, a motor may also be made according to embodiments of the invention.

While the invention has been described with respect to certain embodiments, those embodiments are intended to be exemplary, rather than limiting. Modifications and changes may be made within the scope of the invention, which is defined by the following claims.

What is claimed is:

1. A generator comprising:
a rotor ring having a peripheral channel with respective left and right sidewall portions and a central web portion arranged between the left and right sidewall portions, opposite faces of the central web portion carrying respective first and second sets of magnetic elements;
a stator ring with a peripheral portion that is sized and adapted to be at least partially received in the peripheral channel of the rotor ring between the left and right sidewalls, the peripheral portion having left and right inner faces carrying respective first and second sets of stator teeth, respectively, each of the stator teeth having windings or coils, the rotor ring being constructed and arranged to rotate relative to the stator ring, the positioning of the stator ring relative to the rotor ring establishing first and second axial air gaps between the first and second sets of magnetic elements and the first and second sets of stator teeth; and
one or more sets of rolling gap supports bearing between the stator ring and the rotor ring so as to maintain first and second axial air gaps.

2. The generator of claim 1, wherein the one or more sets of rolling gap supports bear between the stator ring and the central web portion of the peripheral channel of the rotor ring.

3. The generator of claim 1, wherein the peripheral portion of the stator ring is comprised of two halves that meet radially inward of the one or more sets of rolling gap supports.

4. The generator of claim 3, wherein the peripheral portion of the stator ring is generally Y-shaped.

5. The generator of claim 3, wherein the two halves of the stator ring meet at and are secured to a ring-shaped central bar that is connected via spokes to a central portion.

6. The generator of claim 1, further comprising two sets of rolling gap supports, a first set of rolling gap supports being supported by the peripheral portion of the stator ring and bearing against the central web portion of the peripheral channel of the rotor ring on a first side thereof and a second set of rolling gap supports being supported by the peripheral portion of the stator ring and bearing against the central web portion of the peripheral channel of the rotor ring on a second side thereof.

7. The generator of claim 6, wherein the two sets of rolling gap supports are oriented horizontally.

8. The generator of claim 6, wherein the two sets of rolling gap supports are oriented at an angle between about 0° and about 45°.

9. The generator of claim 1, wherein the one or more sets of rolling gap supports are oriented horizontally.

10. The generator of claim 1, wherein the one or more sets of rolling gap supports are oriented at an angle between about 0° and about 45°.

11. The generator of claim 1, further comprising seals between the peripheral portion of the stator ring and inner faces of the peripheral channel of the rotor ring.

12. A generator comprising:
a rotatable rotor ring and a stator ring placed in proximity to one another in association with a shaft so as to define at least one axial air gap between the rotor ring and the stator ring; and
one or more sets of rolling gap supports bearing between the rotor ring and the stator ring along the periphery of the rotor ring and the stator ring, positioned so as to maintain the at least one axial air gap, the sets of rolling gap supports being positioned at an angle between horizontal and about 45°;

wherein the one or more sets of rolling gap supports comprise one or more sets of wheels.

13. The generator of claim 12, wherein the generator comprises a direct drive generator.

14. The generator of claim 13, wherein the generator has a diameter of at least about 3 m.

15. The generator of claim 12, wherein the stator ring is fixed to the shaft and the rotor ring is mounted for rotation about the shaft.

16. A wind turbine with a direct drive generator, comprising:
   two or more blades, each of the two or more blades being connected to a hub, the hub being mounted for rotation about an axle;
      a generator mounted for rotation about the axle, the generator including
      a rotor ring having a peripheral channel with respective left and right sidewall portions and a central web portion arranged between the left and right sidewall portions, opposite faces of the central web portion carrying respective first and second sets of magnetic elements,
      a stator ring with a peripheral portion that is sized and adapted to be at least partially received in the peripheral channel of the rotor ring between the left and right sidewalls, the peripheral portion having left and right inner faces carrying respective first and second sets of stator teeth, respectively, each of the stator teeth having windings or coils, the rotor ring being constructed and arranged to rotate relative to the stator ring, the positioning of the stator ring relative to the rotor ring establishing first and second axial air gaps between the first and second sets of magnetic elements and the first and second sets of stator teeth, and
      one or more sets of rolling gap supports bearing between the stator ring and the rotor ring so as to maintain first and second axial air gaps; and
   a connector coupling the hub or the two or more blades to the generator, such that the rotor ring of the generator is driven to rotate by wind-driven rotation of the hub about the axle.

17. The wind turbine with a direct drive generator of claim 16, wherein the one or more sets of rolling gap supports are oriented substantially horizontally.

18. The wind turbine with a direct drive generator of claim 17, wherein the connector comprises a first interlocking portion disposed on the hub or the two or more blades and a second, complementary interlocking portion disposed on the generator, the shape of the connector and its first and second interlocking portion being such that the connector induces rotational movement, but does not induce non-rotational movement, of the generator.

19. The wind turbine with a direct drive generator of claim 16, wherein the one or more sets of rolling gap supports are oriented at an angle between about 0° and about 45°.

20. The wind turbine with a direct drive generator of claim 16, wherein the connector comprises a first projection disposed on the hub or the two or more blades and a set of two or more complementary projections extending transversely to the first projection on the generator that define a slot for the first projection, such that the connector induces rotational movement and does not induce non-rotational movement of the generator, and does not constrain the generator axially.

* * * * *